United States Patent [19]

Sluys

[11] E Patent Number: Re. 32,229

[45] Reissued Date of Patent: Aug. 26, 1986

[54] UTILITY DISTRIBUTION SYSTEM FOR MARINE FLOATS

[75] Inventor: Wesley W. Sluys, Bellingham, Wash.

[73] Assignee: Builders Concrete, Inc., Bellingham, Wash.

[21] Appl. No.: 497,059

[22] Filed: May 23, 1983

Related U.S. Patent Documents

Reissue of:

[64] Patent No.: 4,353,320
Issued: Oct. 12, 1982
Appl. No.: 137,594
Filed: Apr. 7, 1980

[51] Int. Cl.[4] ..... B63B 35/38

[52] U.S. Cl. ..... 114/267; 405/219

[58] Field of Search ..... 114/263, 266, 267; 52/220; 405/218, 219, 220, 221

[56] References Cited

U.S. PATENT DOCUMENTS

| | | | |
|---|---|---|---|
| Re. 24,837 | 6/1960 | Usab | 405/219 X |
| 3,073,274 | 1/1963 | Lamb | 114/266 |
| 3,091,203 | 5/1963 | Usab | 114/266 |
| 3,128,737 | 9/1961 | Usab | 114/266 |
| 3,128,737 | 4/1964 | Usab | 114/266 |
| 3,191,565 | 6/1965 | Filak | 114/266 |
| 3,552,424 | 1/1971 | Thompson | 137/343 |
| 3,577,863 | 5/1971 | Hudnall | 52/220 |
| 3,580,202 | 5/1971 | Thompson | 114/266 |
| 4,010,581 | 3/1977 | Keturi et al. | 52/220 |
| 4,041,716 | 8/1977 | Thompson | 114/266 |
| 4,070,980 | 1/1978 | Shorter, Jr. | 114/263 |
| 4,085,696 | 4/1978 | Shorter, Jr. | 114/266 |
| 4,124,986 | 11/1978 | Postma | 405/212 |
| 4,252,470 | 2/1981 | Sluys | 114/263 |
| 4,263,865 | 4/1981 | Shorter, Jr. | 114/266 |

OTHER PUBLICATIONS

Oak Harbor Marina, City of Oak Harbor, Conc. Perimeter Float Details, Reid, Middleton and Associates, Inc., Nov. 73, pp. 12 & 26 drawing.

Port of Everett, Phase 1 Marina Reconstruction, Reid, Middleton and Associates, Inc., Dec. 1978, pp. 6, 8, 10, and 13 drawing.

Moss Bay Marina, Marine Systems, Sep. 1974.

Mallard Bay, Main Pier Concrete Floats, Marine Systems, Oct. 1974, drawing No. 4004.

Standard Oil Co., Proposed Floats, Marine Systems, May 1976, drawing No. 52576.

Seattle Yacht Club Fo'cs'le, Float Replacement, Marine Systems, Feb. 1977.

Olympia Yacht Club, Concrete Floats, Marine Systems, May 1977, drawing No. 5207.

Duwamish Marina, Concrete Floats, Marine Systems, Aug. 1977, drawing No. 81077.

Delta Marine Floats, Marine Systems, Oct. 1978, drawing No. 10878.

Unifloat, Huntington Engineering Corp., 7355 Slater Ave., Huntington Beach, California, May 1969, Sheet No. UF-14.

Newport Marina, Marine Systems, Nov. 1977, drawing No. 1147.

Fuel Dock Plan, Harbor Island Marina, San Diego, Huntington Engineering Corp., Huntington Beach, Calif., Apr. 1969, sheet No. F-2.

Hadley Marina, Marine Systems, Nov. 1976, drawing No. 11156.

*Primary Examiner*—Sherman D. Basinger
*Attorney, Agent, or Firm*—Seed and Berry

[57] ABSTRACT

A marine float having a concrete casing surrounding a core of buoyant foam. The casing includes conventional side walls, end walls and a bottom along a specially constructed deck. The deck includes at least one longitudinally extending utility trench which is easily accessible by removing a cover which is releasably secured to the deck. Elongated wales extend along the upper edges of the side walls, and tie rods loosely surrounded by through-tubes extend from one side wall to the other beneath the utility trench. The ends of the tie rods project through the wales, and fastening members are secured thereto thereby securing the wales to the casing and compressively loading the deck. Utility conduits positioned in the utility trench are connected to utility outlets mounted along the side edges of the deck by either transverse utility trenches or transversely extending tubular conduit embedded in the deck.

13 Claims, 10 Drawing Figures

UTILITY DISTRIBUTION SYSTEM FOR MARINE FLOATS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to marine floats of the type utilized to construct floating moorage facilities, and more particularly to a utility distribution structure for such floats.

2. Description of the Prior Art

Floating moorage facilities are commonly constructed by securing a large number of rectangular marine floats to each other end-to-end. It is usually necessary to provide boats moored at the facility with utilities such as electricity, water, sewage and telephone. Various techniques have been used for accomplishing these functions.

One technique commonly employed is the routing of utility conduits within or beneath elongated wales extending along the sides of the floats to secure the floats to each other. This structure is highly advantageous under many circumstances since the utility conduits are readily accessible at the sides of the floats where utility outlets are commonly mounted, and the utility conduits are well protected and concealed. Unfortunately, mounting the utility conduits beneath or within the wales makes them fairly inexcessible for repair or modification such as the addition of new utility service. Additionally, installation of utilities for newly constructed marinas using this technique is fairly expensive.

Another technique for routing utility conduits throughout a moorage facility formed by individual floats is described in U.S. Pat. No. 4,085,696, issued to Shorter, Jr. This latter approach employs a pair of relatively narrow floats which are interconnected by a deck beneath which the utility conduits extend. The utility conduits are fairly accessible since the deck is removable, but the open area between the floats causes the float to have substantially less load carrying ability than unitary floats of comparable width.

Another approach is taught by U.S. Pat. No. 3,580,202, issued to Thompson, in which tubular conduits extend along the float beneath a removable deck. The floats are spaced apart from each other so that the utility conduits are accessible through the open area between adjacent floats. The Thompson approach can thus only be used where the floats are longitudinally spaced apart from each other.

More recently, floats have been developed in which a longitudinally extending utility trench is formed in the deck of the float. The trench, which is normally covered by a removable plate, allows utility conduits to be quickly, easily and inexpensively routed from place to place. The principle problem associated with these conventional utility trench floats is the inherent weakening of the float. Concrete placed under compression is fairly strong, but concrete subject to tensional loading is substantially weaker. In order to place concrete under compressive loading, tie rods normally extend transversely through the deck. Fasteners are then secured to the ends of the tie rods to tension the tie rods and compressively load the deck.

Conventionally used marine floats employing a utility trench utilize a pair of tie rods each extending from one side wall of the float to the adjacent side wall of the utility trench. It has heretofore not been recognized that this structure inherently weakens the float because of the lack of compressive loading beneath the trench due to the absence of a tie rod extending continuously from one side of the float to the other.

SUMMARY OF THE INVENTION

The primary object of the invention is to provide a structure for routing utility conduits through marine floats which allows easy access to the conduits, yet does not degrade the strength of such floats.

It is another object of the invention to provide a marine float having a utility trench formed in its upper surface which allows the use of standardized marine floats components which are commonly used with floats not having utility trenches.

It is still another object of the invention to form a utility trench in the upper surface of a marine float which does not reduce the buoyancy of the float.

These and other objects of the invention are provided by a marine float having a concrete casing surrounding a buoyant core. The casing includes a bottom, two opposed end walls, two opposed side walls connected to opposite edges of the end walls and a generally planer deck extending between the upper edges of the end and side walls. An elongated utility trench extending between the end walls is formed in the deck to facilitate the routing of utility conduits along the float. A plurality of spaced-apart, generally parallel tie rods extend transversely between the side walls beneath the bottom of the trench to provide a continuous transverse structural member from one side of the float to the other. Fasteners secured to the ends of the tie rods tension the tie rods to compressively load the deck of the casing throughout its entire width. A passage is provided between the utility trench and the upper surface of the deck adjacent one side wall. The passage may be formed by either a tubular conduit embedded in the deck or a second, transversely extending utility trench. The tie rods are preferably embedded in ribs projecting downwardly from the deck and integrally formed therewith. In an alternative embodiment, a pair of utility trenches extend along each side of the floats, and a passage is provided between each trench and an opening in the top surface of the deck adjacent the side walls of the float.

DETAILED DESCRIPTION OF THE INVENTION

Figure 1:
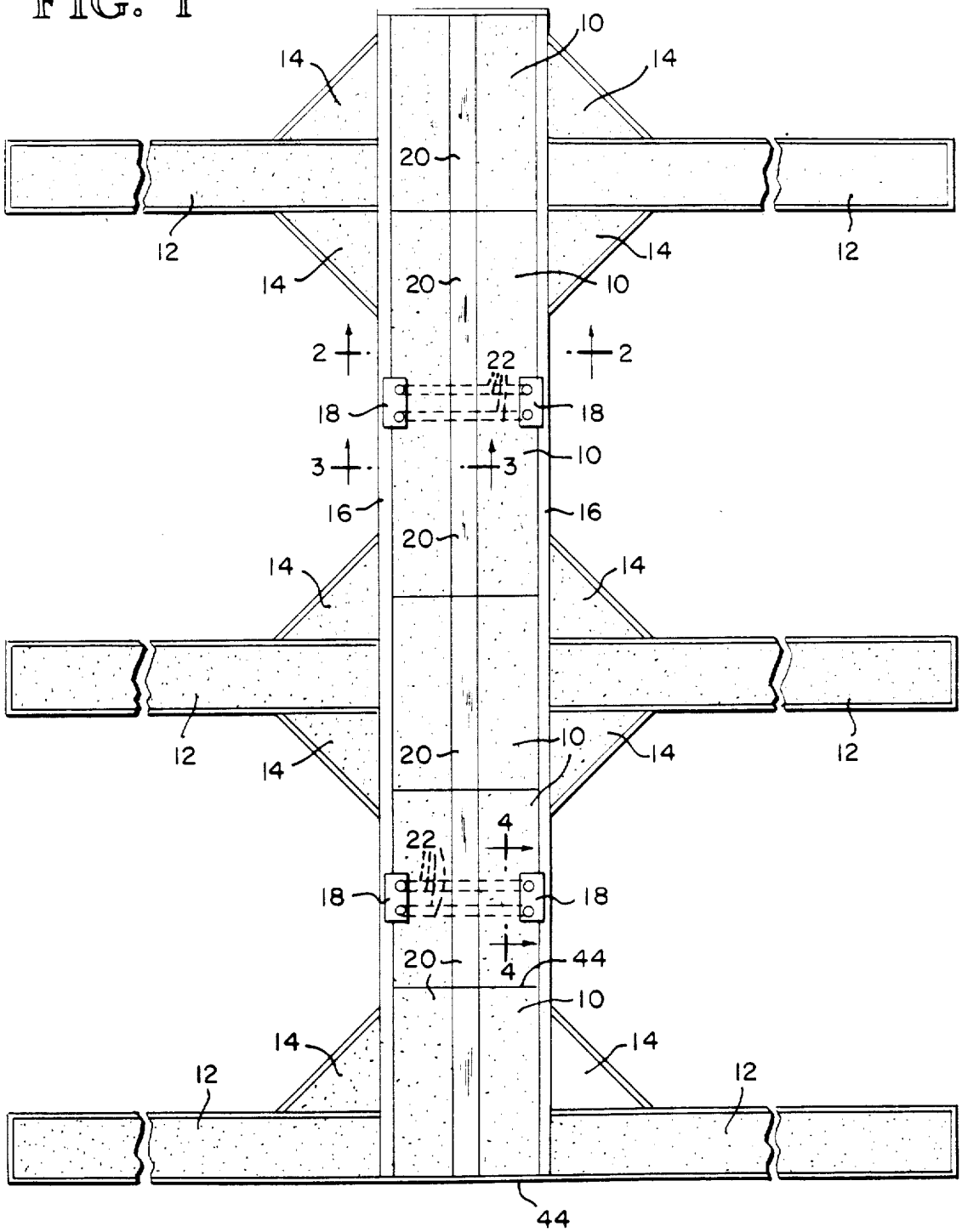
FIG. 1 is a top plan view of a moorage facility employing one embodiment of the inventive marine float.

A floating moorage facility employing the inventive marine floats is illustrated in FIG. 1. The moorage facility is formed by a mainwalk constructed by securing a number of mainwalk floats 10 end-to-end while a plurality of spaced-apart, generally parallel finger floats 12 project perpendicularly from the mainwalk floats 10 and are secured thereto by triangularly shaped gussets 14. The mainwalk floats 10 are normally secured to each other by fastening elongated wales 16 to the upper side edges of the floats 10 with the wales 16 bridging the junction between adjacent mainwalk floats 10. The above described structure is in common use throughout the United States.

It is normally desirable to supply utility service, such as telephone, power, water and sewage, to vessels moored at each of the finger floats 12. These utilities are generally connected to the vessel through a utility outlet fixture 18 mounted on the deck of the float 10 adjacent the sides. A great deal of difficulty has been encountered in routing utility conduits to such fixtures 18 as described above in greater detail.

In accordance with the inventive utility distribution system, utility conduits (not shown) are routed to the utility outlet fixtures 18 by forming an elongated utility trench 20 that have matching elongated covers 24 placed within the deck of each float 10. Passages 22 are then formed in the float 10 to facilitate the placement of utility conduits from the trench 20 to the utility outlet fixtures 18.

Moorage facilities employing mainwalk floats having utility trenches as described above are currently used in at least some portions of the United States. However, these conventionally used utility trench floats utilize a pair of tie rods each extending from one side wall of the float 10 to the adjacent side wall of the utility trench 20 in place of a single tie rod extending from one side wall of the float 10 to the other. The function of the tie rods is to compressionally load the concrete casing, particularly its top surface or deck 34 and end wales, to maximize its strength. However, since tie rods are entirely absent from the area beneath conventional utility trenches, the decks and end walls are not compressionally loaded at their mid-points and thus are easily cracked.

Figure 2:
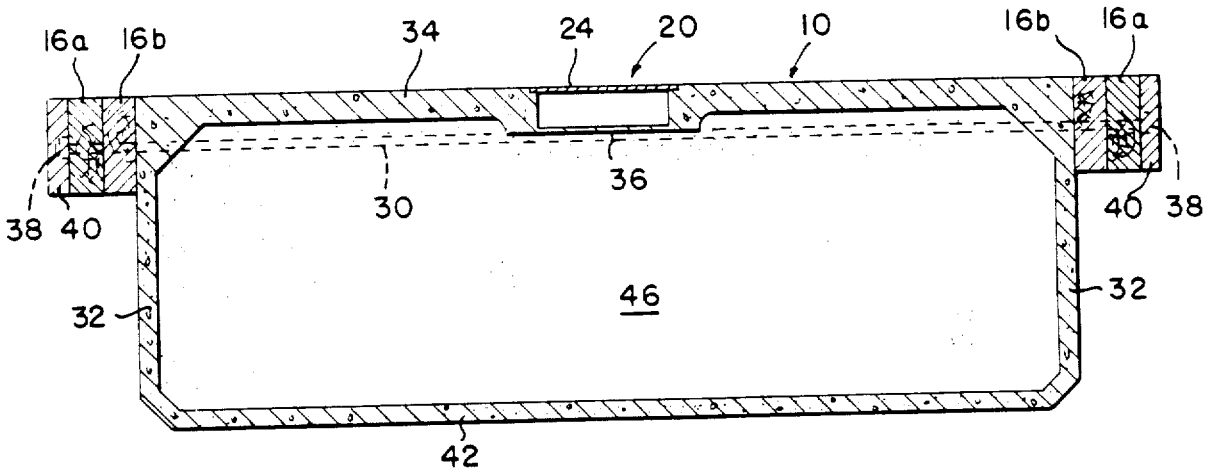
FIG. 2 is a cross-sectional view taken along the line 2—2 of FIG. 1.

The inventive marine floats 10 illustrated in FIG. 1 utilize a single tie rod 30 extending continuously between side walls 32 of the float 10 beneath the bottom of the utility trench 20 as best illustrated in FIG. 2. Consequently, the deck 34 forming the upper surface of the float 10 as well as the end walls and bottom 36 of the utility trench 20 are compressionally loaded throughout the entire width of the float 10.

The manner in which the tie rods 30 are secured to the wales 16 is also illustrated in FIG. 2. The wales 16 are, in actuality, two overlapping wale members 16a,b which are staggered so that the ends of one wale 16a are adjacent the mid portions of the other wales 16b. The ends of the tie rod 30 are threaded, and a nut 38 is threaded onto the tie rod end to tension the tie rod 30 and compressionally load the deck 34, trench bottom 36 and end walls, while securing the wales members 16a,b to the side walls 32 of the float 10. A rub strip 40 is then secured to each of the outer wale members 16a.

As illustrated in FIG. 2, the deck 34, side walls 32, bottom 42 and end walls 44 (FIG. 1) thus form a rigid casing. The casing surrounds a buoyant core 46 which is preferably of a buoyant foam.

Figure 3:
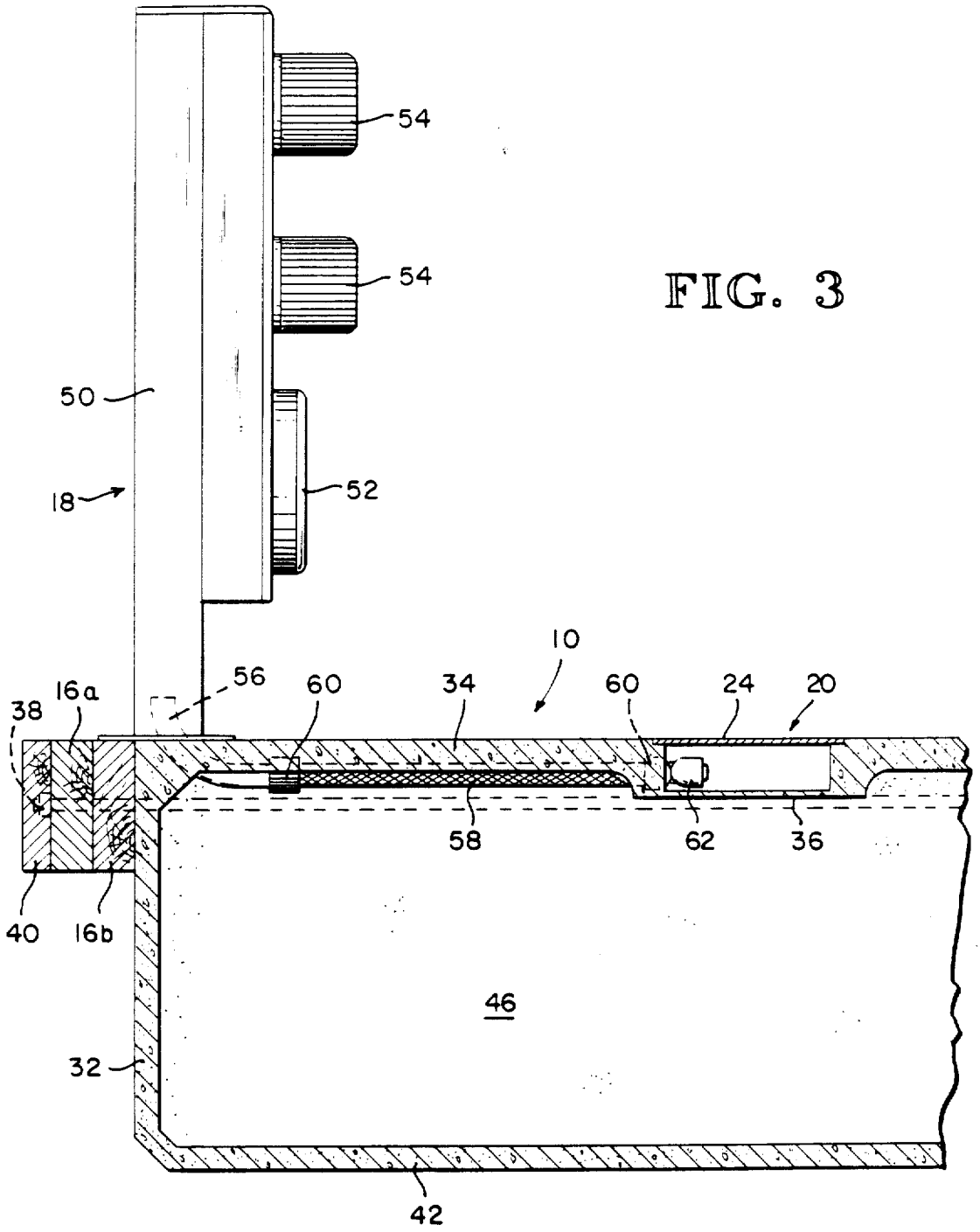
FIG. 3 is a cross-sectional view taken along the line 3—3 of FIG. 1.
Figure 4:
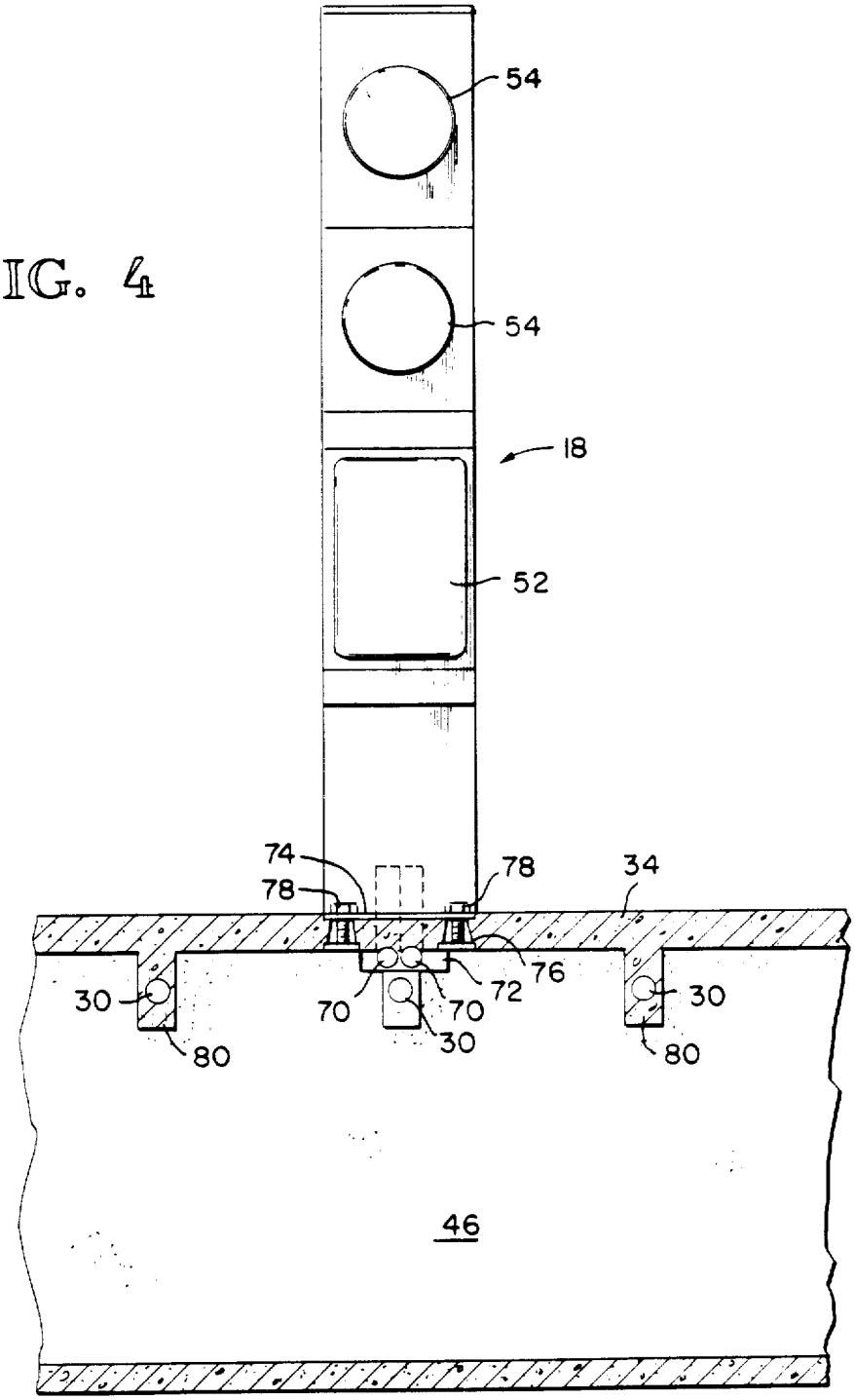
FIG. 4 is a cross-sectional view taken along the line 4—4 of FIG. 1.

Alternative structures for routing utility conduits to the utility outlet fixtures 18 by the passages 22 are illustrated in FIGS. 3 and 4. The utility outlet fixture 18 includes an upstanding frame 50 (FIG. 3) on which conventional utility outlets 52, utility meters 54 are mounted.

As illustrated in FIG. 3, utility conduits are routed to the frame 50 through a pair of upwardly curved tubular conduits 56 from respective straight tubular conduits 58 which open into the interior of the trench 20. The curved conduits 56 are releasably secured to the straight conduits 58 by respective conventional couplings 60 while the opposite ends of the straight conduits 58 are releasably connected to respective terminal boxes 62 mounted within the trench 20 by a similarly constructed couplings 60. The straight tubular conduit 58 as well as the lower portion of the upwardly curved conduit 56 are embedded in the deck 34 of the float 10.

Alternatively, tubular conduits 70 may be positioned in a transverse trench 72 extending perpendicularly to the trench 20 as best illustrated in FIG. 4. The transverse utility trench 72, like the longitudinal utility trench 20, is covered with a plate 74 which is releasably secured to threaded inserts 76 embedded in the deck 34 by screws 78.

In order to increase the load capacity of the deck 34, transverse ribs 80 are preferably formed in the underside of the deck 34 as also illustrated in FIG. 4. The through rods 30 are embedded in the ribs 80 to compressively load the ribs 80. It is readily apparent that, but for the tie rods 30, downward forces exerted on the deck 34 would tend to place the ribs in tension which the concrete ribs 80 would be unable to withstand.

Figure 5:
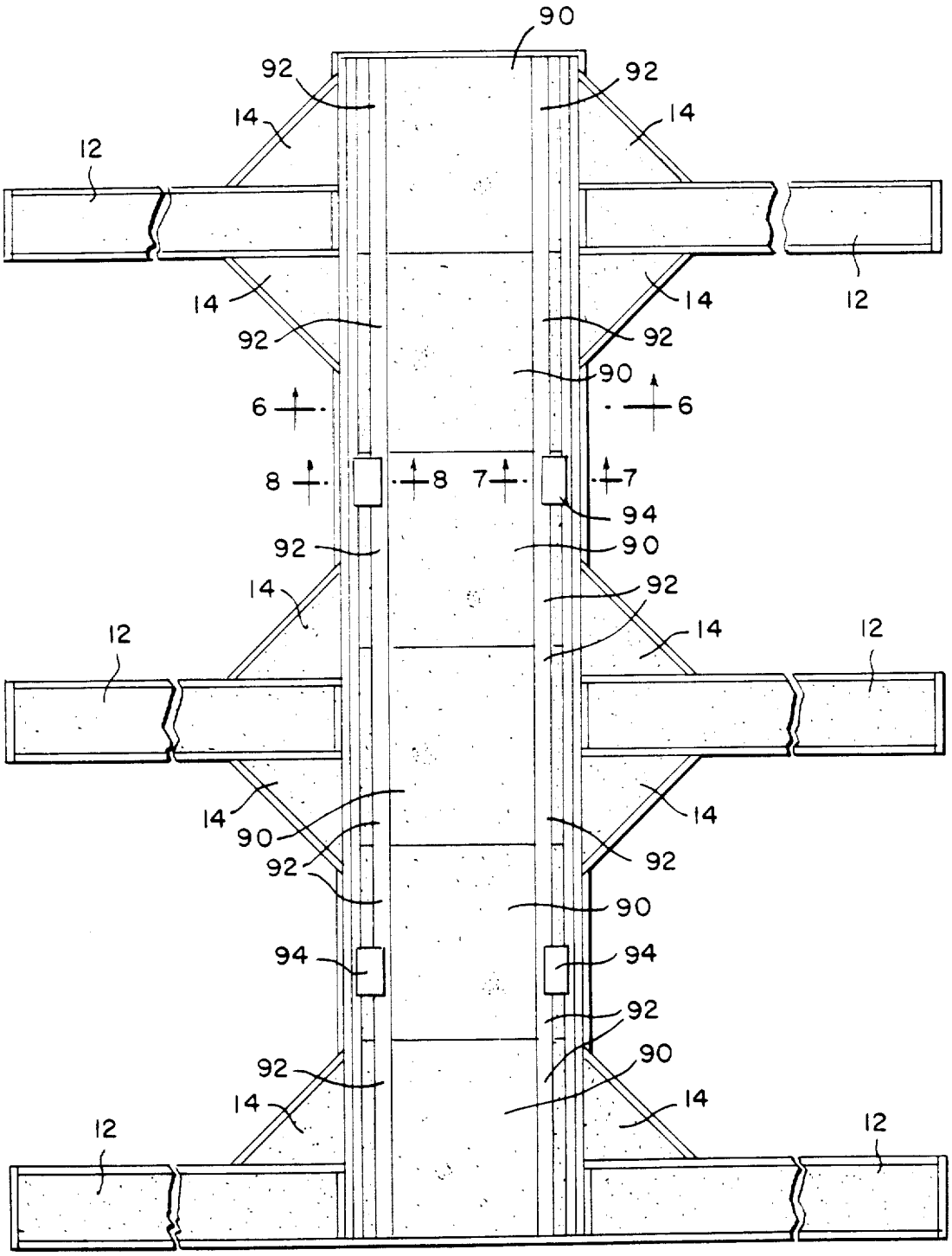
FIG. 5 is a top plan view of a floating moorage facility utilizing an alternate embodiment of the inventive marine float having a pair of utility trenches.

An alternative embodiment of the inventive utility distribution system is illustrated in FIG. 5. This embodiment utilizes mainwalk floats 90 having a pair of utility trenches 92 each extending longitudinally adjacent the side walls of the float 90. The primary advantage of this embodiment is the close proximity of the trenches 92 to utility outlet fixtures 94 positioned adjacent the side walls of the float 90.

Figure 6:
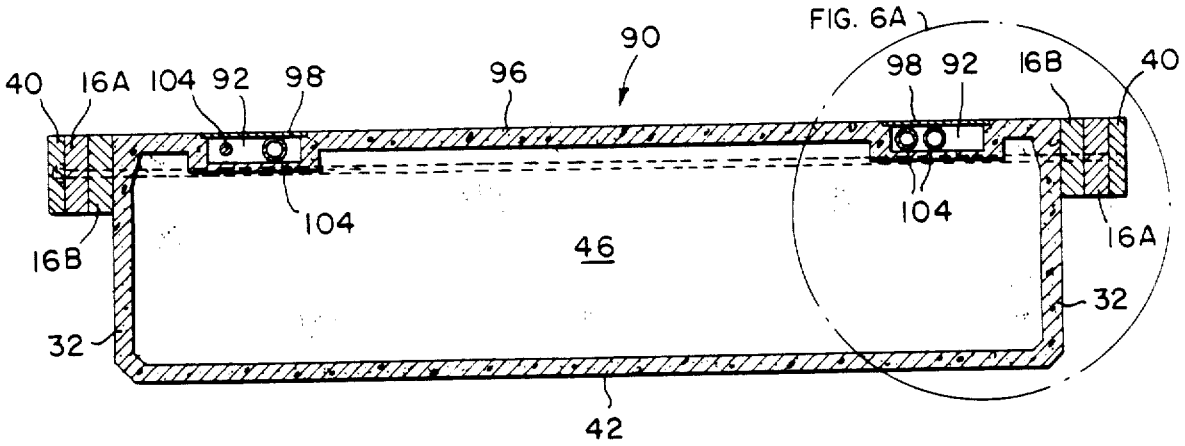
FIG. 6 is a cross-sectional view taken along the line 6—6 of FIG. 5.
Figure 6A:
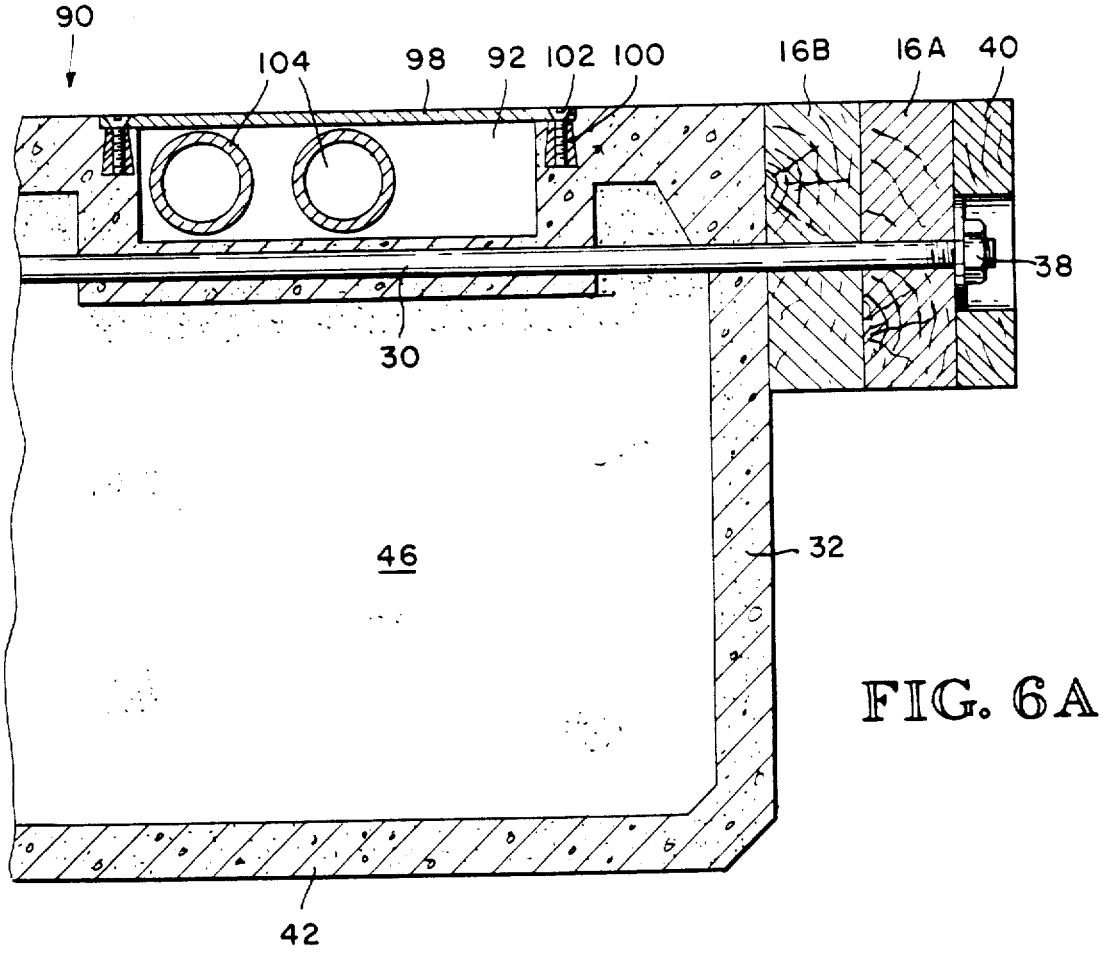
FIG. 6A is a detail view of the circled portion of FIG. 6.

As illustrated in greater detail in FIG. 6, the tie rods 30 extend continuously from one side wall 32 of the float to the other beneath the utility trench 92. Consequently, as with the single utility trench embodiment, the deck 96 of the float 90 is compressionally loaded. The trench 92 is covered by a plate 98 which is releasably secured to an embedded insert 100 by a screw 102. A pair of utility conduits 104 of conventional design are shown running along the utility trench 92 in FIG. 6.

Figures 7, 7A:
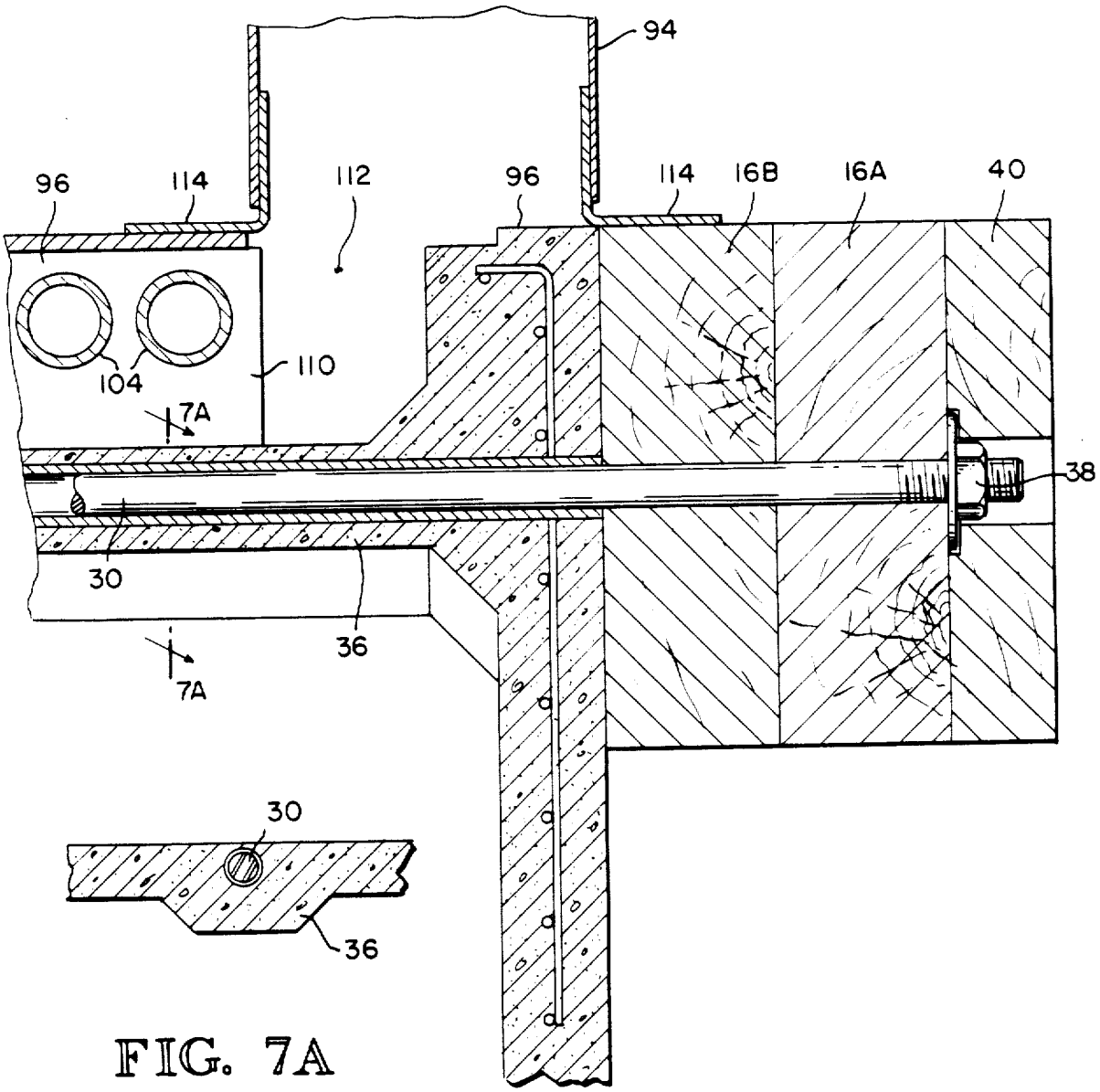
FIG. 7 is a cross-sectional view taken along the line 7—7 of FIG. 5.
FIG. 7A is a cross-sectional view taken along the line 7A—7A of FIG. 7.

One structure for routing the utility conduits 104 to a utility outlet fixture 94 is illustrated in FIG. 7. In this embodiment a passage 110 is formed in the deck 96 which terminates in an opening 112 at the upper surface of the deck 96. A pair of L-shaped flanges 114 are mounted adjacent the opening 112 and the utility outlet fixture 94 is mounted on the flanges 114 to cover the opening 112. The utility conduits 104 can thus easily and quickly be routed to the utility outlet fixtures 94.

Figure 8:
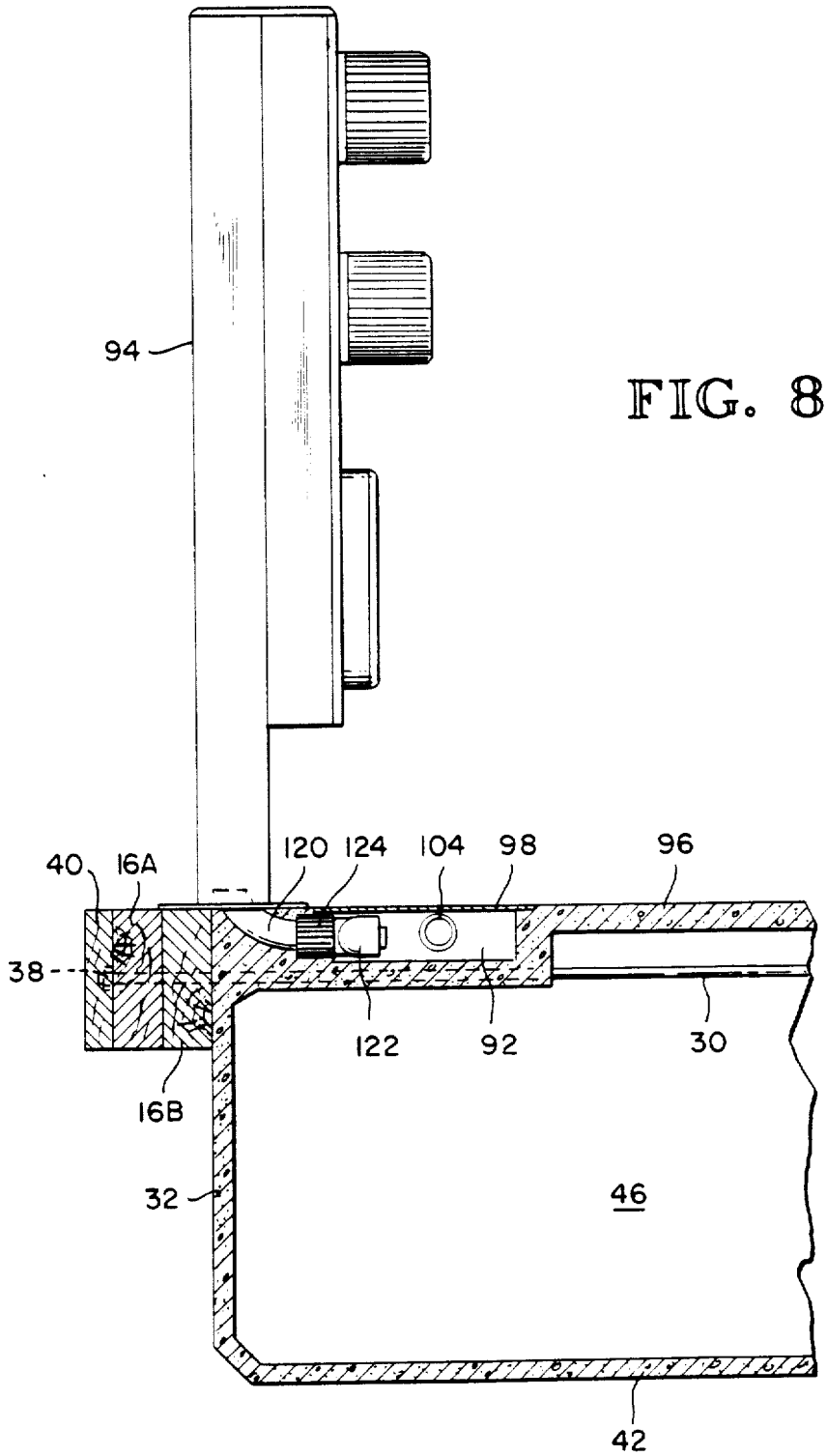
FIG. 8 is a cross-sectional view taken along the line 8—8 of FIG. 5.

An alternative structure for routing the utility conduits 104 to the utility outlet fixture 94 is illustrated in FIG. 8. Instead of utilizing the integrally formed passage 110 of FIG. 7, the embodiment of FIG. 8 employs an upwardly curved tubular conduit 120 which connects to a terminal box 122 through a conventional coupler 124. The upper end of the conduit 120 is positioned beneath the utility outlet fixture.

I claim:

[1. A marine float, comprising a concrete casing surrounding a buoyant core, said casing having a bottom, two opposed end walls, two opposed side walls connecting opposite edges of said end walls and a generally planar deck extending between the upper edges of said end and side walls, said deck having formed therein a longitudinal utility trench having a bottom connecting the lower edges of two trench walls, said trench extending between said end walls to facilitate the routing of utility conduits along said float, said deck also having formed therein a transverse utility passage extending generally perpendicularly from said longitudinal utility trench and opening upwardly in said deck adjacent one side thereof to facilitate the routing of utility conduits to utility outlets mounted adjacent the side walls of the casing, said casing further including a plurality of spaced-apart, generally parallel tie rods extending between said side walls beneath the bottom of said trench, and respective fasteners secured to the ends of said tie rods to tension said tie rods, thereby forcing the side walls of said casing toward each other to compressively load said casing.]

[2. The marine float of claim 1, wherein the ends of said tie rods project through elongated wales extending along the upper edge of each side wall with said fasteners being secured to said tie rods along the outer surfaces of said wales thereby securing said wales to said float.]

[3. The marine float of claim 1, wherein said casing further includes a plurality of parallel spaced-apart ribs projecting downwardly from said deck and integrally formed therewith between the side walls of said casing.]

4. [The marine float of claim 3, wherein] *A marine float, comprising a concrete casing surrounding a buoyant core, said casing having a bottom, two opposed end walls, two opposed side walls connecting opposite edges of said end walls and a generally planar deck extending between the upper edges of said end and side walls, said deck having formed therein a longitudinal utility trench having a bottom connecting the lower edges of two trench walls, said trench extending from one end wall to the other of said end walls to facilitate the routing of utility conduits along said float, said float also having formed therein a transverse utility passage extending from said longitudinal utility trench to the exterior of said casing to facilitate the routing of utility conduits to utility outlets mounted adjacent the side walls of the casing, said casing further including a plurality of spaced-apart, generally parallel tie rods extending between said side walls beneath the bottom of said trench, and respective fasteners secured to the ends of said tie rods to tension said tie rods, thereby forcing the side walls of said casing toward each other to compressively load said casing;*

*said casing further including a plurality of parallel, spaced-apart ribs projecting downwardly from said deck and integrally formed therewith between the side walls of said casing; and* said tie rods [are] *being* embedded in respective [of said] ribs such that said ribs are compressively loaded by said tie rods.

[5. The marine float of claim 1, wherein a tubular conduit is embedded in said deck between said trench and a side wall of said casing to facilitate the routing of said utility conduits from said trench to utility outlets mounted adjacent a side wall of said float.]

[6. The marine float of claim 1, wherein two of said utility trenches are formed in said deck along and closely adjacent said side walls with said tie rods extending between said side walls beneath both of said utility trenches.]

[7. The marine float of claim 6, further including a utility passage extending from each of said trenches to an opening formed in the upper surface of said deck toward the respective adjacent side walls.]

[8. The marine float of claim 7, further including a utility outlet projecting upwardly from said opening and receiving a utility conduit from said trench through said passage.]

[9. The marine float of claim 7, wherein said passages are formed by tubular conduit extending from said utility trench to the upper surfaces of said deck adjacent said side wall.]

10. A marine float comprising:

a buoyant core generally having the shape of a rectangular prismatoid;

a concrete casing surrounding said core, said casing having a bottom, a pair of spaced-apart end walls, a pair of spaced-apart side walls extending longitudinally between corresponding sides of said end walls and a deck connecting the upper edges of said end walls and said side walls, said deck having formed therein an elongated utility trench extending longitudinally between said end walls, and a plurality of spaced-apart, generally parallel ribs extending transversely between said side walls, said ribs projecting downwardly from said deck beneath said trench such that the lower portions of said ribs extend continuously from one side wall to the other;

an elongated wale extending along the upper edge of each side wall;

[transversely positioned, respective] *a plurality of* tie rods extending transversely across said casing beneath said trench, [with] the ends of the said tie rods projecting through the side walls of said casing and said wales, all of said tie rods being embedded in respective ribs so that said ribs brace the side walls of said casing against the tensional forces of said tie rods; *and*

[respective fastener] means mounted on said ends of said tie rods for tensioning said tie rods, thereby securing said wales to said side walls and compressionally loading said casing[; and a passage extending between said utility trench and an opening formed in the upper surface of said deck adjacent one of said side walls for routing utility conduits to a utility outlet mounted on said deck adjacent the opening on the upper surface thereof].

11. The marine float of claim 10, [wherein said passages are formed by tubular conduits embedded in] *additionally including a passage extending between said utility trench and the exterior of said casing for routing utility conduits to a utility outlet mounted on* said deck.

12. The marine float of claim [10] *11*, wherein said [passages are] *passage is* formed by [transverse trenches] *a trench* formed in said deck and extending between said longitudinal trench and one of said side walls.

*13. The marine float of claim 11, wherein said passage is formed by a tubular conduit embedded in said deck, said conduit extending from said longitudinal trench to an opening formed in the upper surface of the said deck adjacent one of said side walls for routing utility conduits to a utility outlet mounted on said deck.*

*14. A marine float, comprising a concrete casing surrounding a buoyant core, said casing having a bottom, two opposed end walls, two opposed side walls connecting opposite edges of said end walls and a generally planar deck extending between the upper edges of said end and side walls, said deck having formed therein a longitudinal utility trench having a bottom connecting the lower edges of two trench walls, said trench extending between said end walls to facilitate the routing of utility conduits along said float, said deck also having formed therein a transverse utility passage extending generally perpendicularly from said longitudinal utility trench and opening upwardly in said deck adjacent one side thereof to facilitate the routing of utility conduits to utility outlets mounted adjacent the side walls of the casing, said casing further including a plurality of parallel spaced-apart ribs projecting downwardly from said deck and integrally formed therewith between the side walls of said casing, and a plurality of spaced-apart, generally parallel tie rods embedded in respective ribs and extending between said side walls beneath the bottom of said trench, and respective fasteners secured to the ends of said tie rods to tension said tie rods and compressively load said ribs and force the side walls of said casing toward each other.*

*15. A marine float comprising:*

*a buoyant core generally having the shape of a rectangular prismatoid;*

*a concrete casing surrounding said core, said casing having a bottom, a pair of spaced-apart end walls, a pair of spaced-apart side walls extending longitudinally between corresponding sides of said end walls and a deck connecting the upper edges of said end walls and said side walls, said deck having formed therein an elongated utility trench extending longitudinally between said end walls, and a plurality of spaced-apart, generally parallel ribs extending transversely between said side walls, said ribs projecting downwardly from said deck beneath said trench such that the lower portions of said ribs extend continuously from one side wall to the other;*

*an elongated wale extending along the upper edge of each side wall;*

*transversely positioned, respective tie rods extending transversely across said casing beneath said trench, with the ends of the said tie rods projecting through the side walls of said casing and said wales, all of said tie rods being embedded in respective ribs so that said ribs brace the side walls of said casing against the tensional forces of said tie rods;*

*respective fastener means mounted on said ends of said tie rods for tensioning said tie rods, thereby securing said wales to said side walls and compressionally loading said casing; and*

*a passage extending between said utility trench and an opening formed in the upper surface of said deck adjacent one of said side walls for routing utility conduits to a utility outlet mounted on said deck adjacent the opening on the upper surface thereof.*

*16. The marine float of claim 15, wherein said passage is formed by a tubular conduit embedded in said deck.*

*17. The marine float of claim 15, wherein said passage is formed by a transverse trench formed in said deck and extending between said longitudinal trench and one of said side walls.*

*18. The marine float of claim 15, wherein said passage extends between said longitudinal trench and one of said side walls.*

*19. A marine float comprising:*

*a buoyant core generally having the shape of a rectangular prismatoid;*

*a concrete casing surrounding said core, said casing having a bottom, a pair of spaced-apart end walls, a pair of spaced-apart side walls extending longitudinally between corresponding sides of said end walls and a deck connecting the upper edges of said end walls and said side walls, said deck having formed therein an elongated utility trench extending longitudinally between said end walls, and a plurality of spaced-apart, generally parallel ribs extending transversely between said side walls, said ribs projecting downwardly from said deck beneath said trench such that the lower portions of said ribs extend continuously from one side wall to the other;*

*an elongated wale extending along the upper edge of each side wall;*

*transversely positioned tie rods extending transversely across said casing beneath said trench, with the ends of the said tie rods projecting through the side walls of said casing and said wales, all of said tie rods being embedded in respective ribs so that said ribs brace the side walls of said casing against the tensional forces of said tie rods;*

*respective fastener means mounted on said ends of said tie rods for tensioning said tie rods, thereby securing said wales to said side walls and compressionally loading said casing; and*

*a passage extending between said utility trench and one of said side walls for routing utility conduits to a utility outlet.*

*20. A marine float, comprising a concrete casing surrounding a buoyant core, said casing having a bottom, two opposed end walls, two opposed side walls connecting opposite edges of said end walls and a generally planar deck extending between the upper edges of said end and side walls, said deck having formed therein a longitudinal utility trench having a bottom connecting the lower edges of two trench walls, said trench extending from one end wall to the other of said end walls to facilitate the routing of utility conduits along said float, said float also having formed therein a transverse utility passage extending from said longitudinal utility trench to the exterior of said casing to facilitate the routing of utility conduits to utility outlets mounted adjacent the side walls of the casing, said casing further including a plurality of spaced-apart, generally parallel tie rods extending between said side walls beneath the bottom of said trench, and respective fasteners secured to the ends of said tie rods to tension said tie rods, thereby forcing the side walls of said casing toward each other to compressively load said casing;*

*the ends of said tie rods project through elongated wales extending along the upper edge of each side wall, with said fasteners being secured to said tie rods along the outer surfaces of said wales, thereby securing said wales to said float;*

*said casing further includes a plurality of parallel, spaced-apart ribs projecting downwardly from said*

*deck and integrally formed therewith between the side walls of said casing; and*

*wherein said tie rods are embedded in respective of said ribs such that said ribs are compressively loaded by said tie rods.*

*21. A marine float comprising:*

*a buoyant core generally having the shape of a rectangular prismatoid;*

*a concrete casing surrounding said core, said casing having a bottom, a pair of spaced-apart end walls, a pair of spaced-apart side walls extending longitudinally between corresponding sides of said end walls and a deck connecting the upper edges of said end walls and said side walls, said deck having formed therein an elongated utility trench extending longitudinally between said end walls, and a plurality of spaced-apart, generally parallel ribs extending transversely between said side walls, said ribs projecting downwardly from said deck beneath said trench such that the lower portions of said ribs extend continuously from one side wall to the other;*

*an elongated wale extending along the upper edge of each side wall;*

*transversely positioned tie rods extending transversely across said casing beneath said trench, with the ends of the said tie rods projecting through the side walls of said casing and said wales, all of said tie rods being embedded in respective ribs so that said ribs brace the side walls of said casing against the tensional forces of said tie rods;*

*respective fastener means mounted on said ends of said tie rods for tensioning said tie rods, thereby securing said wales to said side walls and compressionally loading said casing; and*

*a passage extending between said longitudinal trench and one of said side walls.*

* * * * *